United States Patent [19]

Kudo et al.

[11] Patent Number: 4,578,257
[45] Date of Patent: Mar. 25, 1986

[54] PROCESS FOR REMOVING SULFUR DIOXIDE FROM OFF-GAS

[75] Inventors: Yoshihiko Kudo; Eiji Yoshida, both of Fukushima, Japan

[73] Assignee: Kureha Chemical Industry Co., Ltd, Japan

[21] Appl. No.: 720,811

[22] Filed: Apr. 8, 1985

Related U.S. Application Data

[63] Continuation-in-part of Ser. No. 612,612, May 21, 1984, abandoned.

[30] Foreign Application Priority Data

Dec. 13, 1983 [JP]  Japan ................................. 58-234841

[51] Int. Cl.$^4$ ............................................... C01B 17/00
[52] U.S. Cl. ....................................... 423/243; 423/166
[58] Field of Search ................... 423/243, 166, 242 A, 423/242 R

[56] References Cited

U.S. PATENT DOCUMENTS

| | | | |
|---|---|---|---|
| 3,757,488 | 9/1973 | Austin et al. | 423/243 |
| 3,798,309 | 3/1974 | Knowles et al. | 423/243 |
| 3,928,537 | 12/1975 | Saitoh et al. | 423/243 |
| 4,092,402 | 5/1978 | Kobuyashi et al. | 423/243 |
| 4,367,205 | 1/1983 | Kudo et al. | 423/243 |

FOREIGN PATENT DOCUMENTS

| | | | |
|---|---|---|---|
| 49-52178 | 5/1974 | Japan | 423/243 |
| 53-30472 | 3/1978 | Japan | 423/243 |
| 54-25262 | 2/1979 | Japan | 423/243 |

*Primary Examiner*—Gregory A. Heller
*Attorney, Agent, or Firm*—McGlew and Tuttle

[57] ABSTRACT

Disclosed is an improvement in a process for desulfurization of off-gas, which process comprises contacting an off-gas which contains sulfur dioxide with an absorbing solution containing at least a sulfosuccinate, a sulfate and a crystalline gypsum to absorb the sulfur dioxide for removal therefrom, and oxidizing the resulting absorbed solution with an oxygen-containing gas while neutralizing the solution with limestone in order to fix the sulfur dioxide in the form of gypsum for separation. The improvement comprises adding maleic anhydride and limestone to the absorbed solution during the residence time of the absorbed solution, the resulting absorbed solution being oxidized with an oxygen-containing gas to reproduce an absorbing solution therefrom so as to be effectively reused for the absorption of sulfur dioxide in the off-gas for separation.

3 Claims, 1 Drawing Figure

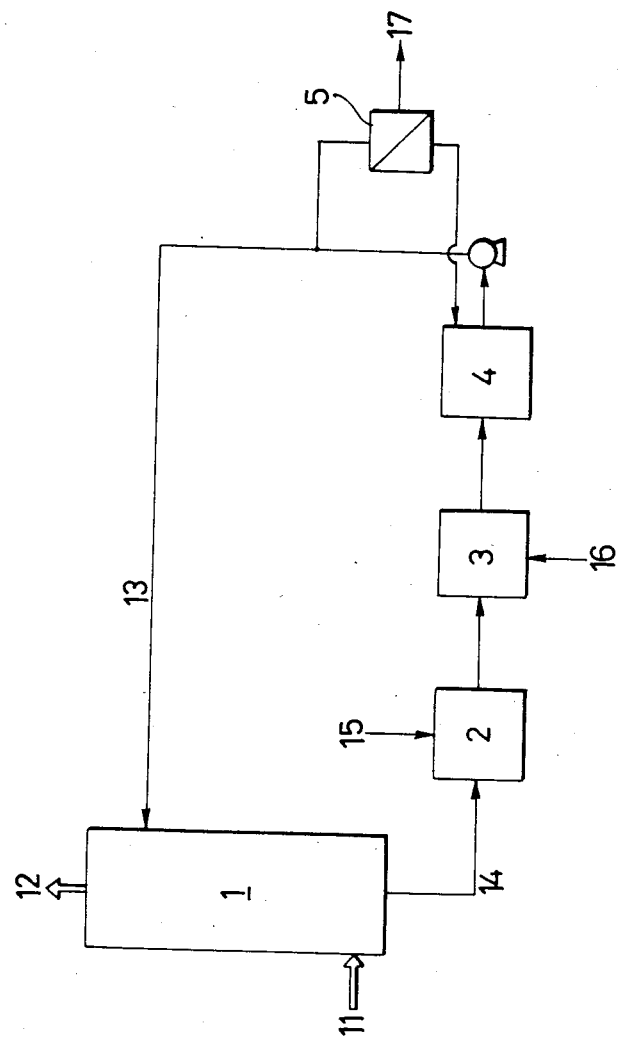

PROCESS FOR REMOVING SULFUR DIOXIDE FROM OFF-GAS

BACKGROUND OF THE INVENTION

This is a continuation-in-part application of Ser. No. 612,612, filed on May 21, 1984 now abandoned by the same inventors and assigned to the same assignee.

This invention relates to an improvement in an off-gas desulfurization process which comprises fixing sulfur dioxide contained in the off-gas into the form of gypsum for removal therefrom by using an absorbing solution containing in particular a sulfosuccinate.

Attention has recently been focused, because of its advantages in desulfurization efficiency and economy, to a wet off-gas desulfurization process which comprises contacting sulfur dioxide contained in an off-gas with an absorbing solution containing an organic carboxylic acid and a salt thereof, and oxidizing the resulting absorbed solution while neutralizing the solution with limestone in order to fix the sulfur dioxide in the form of gypsum for separation.

In this process, the combination of an absorption reaction of sulfur dioxide with an absorbing solution containing an organic carboxylate and a neutralizing reaction of the absorbed solution with limestone improves the desulfurization effect and promotes remarkably the gypsum-forming reaction, resulting in a reduction in both plant costs and power consumption.

The advantages mentioned above come about because, in this process, an absorbing solution containing an organic carboxylate is used to form a mixed system of carboxylate ion ($RCOO^-$) and carboxylic acid ($RCOOH$), so as to cause the solution to have good pH buffer capacity in a pH range of from 3 to 6, and because the carboxylate ion and the carboxylic acid may be present in the dissolved state in the absorbing solution containing a calcium compound such as limestone, gypsum or the like.

This wet off-gas desulfurization process for removing sulfur dioxide from an off-gas by coverting it to qypsum, usually called the "qypsum by-producing process", essentially consists of an absorption reaction of sulfur dioxide with an absorbing solution, an oxidation reaction of the absorbed solution with an oxygen-containing gas such as air, and a neutralizing reaction of the absorbed solution with limestone. Each reaction causes a pH change in the absorbing solution and, among the reactions, the higher the pH, the more effectively the absorption reaction of sulfur dioxide takes place, while a lower pH is preferable for the neutralization reaction with limestone. Therefore, in order to conduct each reaction as effectively as possible, it is necessary to maintain the pH of the absorbing solution in a weak acidic range of from 3 to 6 and it is preferable that the pH change during each reaction be small.

In the off-gas desulfurization process described above, the use of a liquid containing an organic carboxylate as the absorbing solution causes each reaction to take place effectively, because in the pH range of from 3 to 6 the organic carboxylate has a good pH buffer capacity. In the industrial application of this off-gas desulfurization process, the organic carboxylate used in the absorbing solution must satisfy the following conditions:

(i) The ratio of buffer capacity to unit cost must be high;

(ii) Decomposition induced by the oxidation of the sulfite must be at a low level;

(iii) The vapor pressure of the free acid must be low;

(iv) The oxidation reaction of the sulfite in the absorbed solution with air must not be inhibited;

(v) The organic carboxylate itself and any by-products caused by the decomposition thereof must not be injurious and must have good biodegradability; and (vi) Large scale production must be possible.

In selecting the carboxylic acid for the absorbing solution in accordance with the above conditions, unsaturated carboxylic acid such as maleic acid is to be excluded in view of condition (ii); aliphatic monocarboxylic acid such as acetic acid is to be excluded because of condition (iii); oxycarboxylic acid such as glycolic acid is excluded in view of condition (iv); and aromatic carboxylic acid is to be excluded in view of condition (v).

As a result, in the selection of the carboxylic acid, only lower saturated aliphatic polybasic acids remain and, given condition (vi), examples of the carboxylic acid which may be selected include dicarboxylic acids such as succinic acid, glutaric acid, adipic acid, and the like; and sulfocarboxylic acids such as sulfoacetic acid, beta-sulfopropionic acid, sulfosuccinic acid, and the like.

Dicarboxylic acids are utilizable directly as they are, while sulfocarboxylic acids are obtained by the reaction of a sulfite with monochloroacetic acid, acrylic acid, maleic acid or fumaric acid (see Japanese patent publication No. 25492/1983).

Further, studies have been conducted of condition (ii), that is, of the decomposability of carboxylic acid in order to obtain experimental data on the degree of decomposition among certain carboxylic acids, wherein the following relationships apply:

sulfoacetic acid $<$ sulfosuccinic acid $<$
adipic acid $\approx$ beta-sulfopropionic acid $\approx$
glutaric acid $\approx$ succinic acid $\approx$ maleic acid, wherein the symbol "$<$" means that the degree of decomposition of the acid following the symbol is greater than that of the acid preceding it; the symbol "$\approx$" indicates that the degree of decomposability of the acid following the symbol is nearly the same as that of the acid preceding it; finally, the symbol "$<<$" represents a degree of decomposition even greater than the symbol "$<$" mentioned above.

A low degree of decomposition is not only economically advantageous, but also produces small amounts of by-products due to decomposition.

Additional data obtained on the by-products due to decomposition of carboxylic acid are as follows: although the substance formed by the induced oxidative decomposition of carboxylate ($RCOO^-$) is primarily carbon dioxide, which is formed not only from the carboxyl group ($COO^-$) but also from the hydrocarbon group (R), it also consists of various organic substances. Of these organic substances, volatile substances in particular are discharged from an absorber into the atmosphere. However, some of these volatile substances, depending on the properties thereof, are undesirable from the standpoint of environmental pollution. American studies have shown that adipic acid, for example, decomposes to form n-valeic acid and $C_{1-4}$ n-paraffins as by-products which are discharged into the atmosphere, and that n-valeic acid in particular produces an offensive odor.

Further, glutaric and succinic acids decompose to by-produce n-butyric acid and propionic acid, respectively. These by-products also produce offensive odors. Against this, sulfocarboxylic acid does not by-produce such volatile aliphatic monocarboxylic acids, as mentioned above, by decomposition (see U.S. Pat. No. 4,367,205).

Sulfocarboxylic acid by-produces only trace amounts of volatile organic substances such as methane, formaldehyde and acetaldehyde. However, these by-products cause no problem, since the discharged concentrations thereof can be reduced to less than one tenth (1/10) that of aldehydes contained in amounts of about 1 ppm in untreated combustion off-gas. Almost all organic substances by-produced from sulfocarboxylic acids are converted into non-volatile, ionic compounds. Beta-sulfopropionic acid, sulfoacetic acid, isethionic acid, 1,2-ethanedisulfonic acid, ethanesulfonic acid and methanesulfonic acid are by-produced from sulfosuccinic acid; isethionic acid and ethanesulfonic acid are by-produced from beta-sulfopropionic acid; and methanesulfonic acid is by-produced from sulfoacetic acid. However, since these by-products are subjected to eventual oxidative decomposition to carbon dioxide, and are discharged out of the system together with gypsum, they create no problem in the desulfurization process.

The present inventors studied the cost, the degree of decomposition and the decomposition by-products of sulfocarboxylic acid based on the above factors, and have concluded that the off-gas desulfurization process, such as the "gypsum by-producing process" described above, in which an absorbing solution containing sulfosuccinate as the organic carboxylate is used, is the most economical and that a salt of sulfosuccinic acid in the absorbing solution is preferable for use.

However, one problem in the industrial utilization of the above off-gas desulfurization process, in which a liquid containing sulfosuccinate is used as the absorbing solution, is that sulfosuccinic acid and salts thereof are not commercially available and, therefore, have to be synthesized from maleic acid or from fumaric acid.

SUMMARY OF THE INVENTION

It is an object of this invention to solve the above problems and to improve the technology of the off-gas desulfurization process by synthesizing sulfosuccinate within the desulfurization reaction system itself.

Other objects and advantages of this invention will become apparent from the following description thereof:

The present invention is characterized in that in the off-gas desulfurization process which comprises contacting an off-gas containing sulfur dioxide with an absorbing solution containing at least a sulfosuccinate of the type described more fully herebelow, a sulfate such as sodium sulfate, magnesium sulfate or ammonium sulfate, and crystalline gypsum to absorb the sulfur dioxide for removal therefrom, and oxidizing the resulting absorbed solution with an oxygen-containing gas while neutralizing the absorbed solution with limestone in order to fix the sulfur dioxide in the form of gypsum for separation, the improvement comprising adding maleic anhydride and limestone to the resulting absorbed solution, in which sulfur dioxide is absorbed, during the residence time of the absorbed solution, and oxidizing the absorbed solution with an oxygen-containing gas to form in situ a sulfosuccinate.

The sulfates particularly described hereabove are those which are generally utilized in the absorbing solution of a conventional off-gas desulfurization process. Further, the term "a sulfosuccinate" signifies, in the present invention, a sulfosuccinate formed between a tribasic acid anion represented by the formula

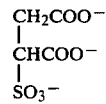

and a cation such as $Na^+$, $Mg^{++}$ or $NH_4^+$. Given the above interpretation, the sulfosuccinate of the invention does not, therefore, encompass such materials as dibutyl sodium sulfosuccinate and the like.

BRIEF DESCRIPTION OF THE DRAWINGS

In the accompanying drawings, the single FIGURE is a schematic illustration of one form of an apparatus used in the Example of the present invention. In the reference numerals, 1 represents the absorber, 2 is the reactor for sulfosuccinate production and gypsum formation, 3 is the oxidation reactor, 4 is a cushion tank, 5 is the gypsum separator, 11 represents a heavy petroleum oil C combustion off-gas inlet, 12 indicates a purified off-gas outlet, 13 is the absorbing solution inlet, 14 is the absorbed solution discharge line from the absorber, 15 is the water slurry of limestone powder inlet, 16 indicates an air inlet for oxidation, and 17 represents the by-produced gypsum outlet line.

DETAILED DESCRIPTION OF THE INVENTION

The present invention is characterized in that a sulfosuccinate of the type described hereabove is formed in situ by the reaction (addition reaction) of a sulfite in an absorbed solution, in which sulfur dioxide is absorbed, with maleic anhydride.

Sulfosuccinic acid may also be synthesized by the addition reaction of maleic acid or fumaric acid or salts thereof to a sulfite. The technical reason why maleic anhydride in particular is selected in the present invention will be explained herebelow.

Generally, the desulfurization process, in which the absorbing solution is brought into countercurrent contact with an $SO_2$ containing off-gas, provides such good desulfurization that the liquid/gas (L/G) ratio may be low and, as a result, the sulfite concentration in the absorbed solution may remain at a relatively high level. For example, absorption of an off-gas containing 1500 ppm of sulfur dioxide at an L/G ratio of 4 liters per $Nm^3$ in a perforated plate column resulted in obtaining an absorbed solution having a sulfite concentration of about 15 m-mol/kg. To separate absorbed solutions having about the same sulfite concentration as the above were added maleic acid, fumaric acid and maleic anhydride to be reacted at 55° C. in a pH range of 4 to 6. The time required for the synthesis of sulfosuccinic acid in each case was measured. It was found that it took from 20 to 100 hours for the maleic acid to reach a yield of 90% depending on the reaction conditions, while it took ten times the above amount of time for fumaric acid to reach the same yield. Unexpectedly, conversion of maleic anhydride into sulfosuccinate took place very rapidly.

The reaction with maleic anhydride, by which the maleic anhydride (m.p. 53° C.) that had been charged for reaction melted and the resulting oil drops finished dissolving in an aqueous solution, took place in one to two minutes. As it can be seen from the above experimental results, the reaction rate with maleic acid or fumaric acid was so slow that their use is not practical in synthesizing sulfosuccinic acid within the system of the process.

It is presumed from the much higher conversion rate of maleic anhydride into sulfosuccinic acid, compared with that of maleic acid, that maleic anhydride reacts directly with sulfites and not through maleic acid, although it is normal for maleic anhydride to be brought into contact with water and hydrated to form maleic acid. The direct reaction of maleic anydride with sulfite is also presumed to take place from the fact that the addition of maleic anhydride to an aqueous alkaline sulfite solution having a pH beyond the pH range of the present invention temporarily produces a deep yellow substance on the solid or drop surface of the maleic anhydride and, after the completion of the reaction, complicated organic compounds, in addition to sulfosuccinate, are formed in an amount of from 10 to 20 mol %.

The above phenomena do not occur when maleic acid is used. Therefore, the reaction mechanism is presumed to be such that a hydrogen sulfite ion is rapidly added to the double bond of maleic anhydride followed by hydration, i.e., ring cleavage of the acid anhydride. A hydration reaction of maleic anhydride with water takes place to some degree along with the direct reaction. Since the direct reaction and the hydration reaction are competitive with each other, in order to increase the conversion to sulfosuccinic acid, it is necessary to minimize the by-production of maleic acid by increasing the molar ratio of the sulfite to maleic anhydride so that the concentration of the sulfite remaining after the reaction may be increased, and by increasing the intensity of agitation.

The by-produced maleic acid is converted to sulfosuccinic acid very slowly, as decribed above, and is decomposed at such a high decomposition rate as to be about three to four times that of sulfosuccinic acid. Thus the by-production of maleic acid is undesirable from the point of view of economy.

For this reason, in the practice of the present invention, at the stage of neutralizing the absorbed solution obtained by absorbing sulfur dioxide in an absorbing solution containing a sulfosuccinate with limestone, maleic anhydride and limestone are added to the absorbed solution during a specified residence time of the absorbed solution followed by an oxidation with an oxygen-containing gas such as air. The addition of maleic anhydride at the neutralization stage of the absorbed solution results in a specified residence time of the sulfite in the absorbed solution at a high concentration thereof at the neutralization stage, and results in an increased sulfite-to-maleic anhydride molar ratio and, consequently, the reaction rate of sulfosuccinate formation is increased by agitation in order to dissolve the limestone added for neutralization in the absorbed solution.

Sulfosuccinic acid may be produced in situ at a high yield of 90 mol % or more under the following reaction conditions at the neutralization stage:

(i) The residence time of the sulfite in the absorbed solution at a high concentration is preferably 3 minutes or more;

(ii) The amount (k-mol/hr) of the sulfite in the absorbed solution for the formation of sulfosuccinic acid is preferably twice or more the amount of maleic anhydride added to the neutralization stage, and the concentration of the sulfite remaining in the resulting reaction mixture after the completion of the formation reaction is preferably 5 m-mol/kg or more;

(iii) A sulfate, which is necessary for keeping the sulfite at a high concentration dissolved therein, is present therewith; and (iv) The pH remains in the range of from 4 to 6 and the temperature is kept above the melting point (53° C.) of maleic anhydride.

When maleic anhydride is directly added at or after the oxidation stage, the maleic anhydride is hydrated to form substantially maleic acid, and the resulting maleic acid then reacts with the sulfite in the absorbed solution. Thus, the rate of reaction of sulfosuccinic acid formation, as mentioned above, is so low that the unreacted maleic acid is decomposed to a greater degree of decomposition than that of sulfosuccinc acid. This is obviously impractical.

As mentioned above, according to the present invention, since the sulfosuccinate in the absorbing solution can be advantageously synthesized within the system, the absorbing solution can be reproduced from the absorbed solution without providing any additional devices for separately synthesizing the sulfosuccinate to be fed back into the system, or for withdrawing the absorbed solution out of the system. adding thereto maleic anhydride to synthesize sulfosuccinate, and feeding sulfosuccinate back into the system.

The present invention, thus, contributes to improving the technology of off-gas desulfurization processes, more specifically the "gypsum by-producing" process, in which an absorbing solution containing a specified sulfosuccinate is used as the absorbing solution for sulfur dioxide, The present invention will be explained in greater detail by the following Example. However, the scope of the present invention is not to be limited to or by the illustrative Example.

EXAMPLE

This example shows the unexpected results obtained from an experiment which was carried out by adding maleic anhydride in place of sulfosuccinate directly to the absorbed solution in a system operated under the conditions described herebelow and using the apparatus shown in the accompanying drawing. The parameters of the various elements of the flow-sheet FIGURE were as follows:

The absorber 1 was of the countercurrent contact type and had a diameter of 2.8 meters; the reactor 2 for sulfosuccinate production and gypsum formation had an actual volume of 23 m$^3$ and was equipped with a 3.7 kw stirrer; the oxidation reactor 3 had an actual volume of 24 m$^3$; the cushion tank 4 had an actual volume of 20–22 m$^3$; the gypsum separator 5 was a centrifugal separator; the flow rate of the heavy petroleum oil C combustion off-gas was 27000 Nm$^3$/hr on a wet basis and the SO$_2$ concentration was 1500 ppm on a dry basis; the SO$_2$ concentration in the purified off-gas stream was less than 1 ppm; the flow rate of the absorbing solution was 120 m$^3$/hr.

The operation conditions may be summarized as follows:

An aqueous tri-sodium sulfosuccinate solution separately prepared and stored was fed to the oxidation reactor 3 so that the concentration of sulfosuccinic acid in the absorbing solution could be maintained at 1.0% by weight as tri-sodium sulfosuccinat Limestone powder of 200 mesh was fed to the reactor 2 depending on the amount of $SO_2$ to be absorbed. Thereafter, a reaction took place in each of the reactors 2, 3 and 4 so as to form gypsum, and the sulfurous acid moiety of about 11 m-mol/kg in the absorbed solution 14 was reduced to about 0.8 m-mol/kg by air oxidation in the oxidation reactor 3.

Subsequently, feeding of tri-sodium sulfosuccinate to the oxidation reactor 3 was stopped, and when the concentration of sulfosuccinic acid was reduced to 0.96% by weight as tri-sodium sulfosuccinate, 12.5 kg of maleic anhydride in a solid pellet state were charged into reactor 2. Immediately after the charge of maleic anhydride, the pH of the solution in the reactor at 59° C. was temporarily reduced from 5.5 to 4.8.

An analysis of the unreacted maleic acid in the solution remaining in the reactor showed that the reaction yield for the preparation of sulfosuccinic acid from maleic anhydride was higher than 90 mol %.

The same procedure as above was repeated during a one-month plant run, in the sense that, when the concentration of the sulfosuccinic acid in the absorbing solution was being reduced to 0.96% by weight as the tri-sodium sulfosuccinate, 12.5 additional kilograms of maleic anhydride were charged into the reactor 2

Throughout this period of time, the average molar amount of maleic anhydride used was the same as the average amount of sodium sulfosuccinate solution used prior to the addition of maleic anhydride. This fact means that almost all of the maleic anhydride was converted into sulfosuccinic acid.

What is claimed is:

1. In the off-gas desulfurization process which comprises contacting a sulfur dioxide-containing off-gas with an absorbing solution containing at least a sulfosuccinate formed between a tribasic acid anion represented by the formula

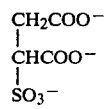

and a cation selected from $Na^+$, $Mg^{++}$ and $NH_4^+$, a sulfate selected from sodium sulfate, magnesium sulfate and ammonium sulfate, and crystalline gypsum to absorb the sulfur dioxide for removal therefrom, and oxidizing the resulting absorbed solution with an oxygen-containing gas, while neutralizing the absorbed solution with limestone in order to fix the sulfur dioxide in the form of gypsum for separation, the improvement comprising adding maleic anhydride and limestone to the absorbed solution in which sulfur dioxide is absorbed during the residence time of the absorbed solution, and oxiding the resulting absorbed solution with an oxygen-containing gas to reproduce an absorbing solution therefrom.

2. The process according to claim 1, wherein the average residence time of the absorbed solution is at least 3 minutes.

3. The process according to claim 1 or 2, wherein the maleic anhydride and limestone are added to the absorbed solution at a temperature above 53° C. and at a pH of from 4 to 6.

* * * * *